United States Patent [19]

Gentischer et al.

[11] E Patent Number: Re. 33,335

[45] Reissued Date of Patent: Sep. 18, 1990

[54] DEVICE FOR ATTACHING A TOOL

[75] Inventors: Josef Gentischer, Weinstadt; Boris Rudolf, Stuttgart, both of Fed. Rep. of Germany

[73] Assignee: C. & E. Fein GmbH & Co., Stuttgart, Fed. Rep. of Germany

[21] Appl. No.: 213,180

[22] Filed: Jun. 29, 1988

Related U.S. Patent Documents

Reissue of:

[64] Patent No.: 4,597,227
Issued: Jul. 1, 1986
Appl. No.: 680,194
Filed: Dec. 10, 1984

[30] Foreign Application Priority Data

Feb. 18, 1984 [DE] Fed. Rep. of Germany ..... 3405885
Apr. 14, 1984 [DE] Fed. Rep. of Germany ..... 3414148
Aug. 30, 1984 [DE] Fed. Rep. of Germany ..... 3431901

[51] Int. Cl.[5] ..... B24B 23/02
[52] U.S. Cl. ..... 51/168; 83/666
[58] Field of Search ..... 51/168, 170 R, 170 PT, 51/170 T; 83/666, 698; 279/1 K, 8

[56] References Cited

U.S. PATENT DOCUMENTS

| | | |
|---|---|---|
| 870,220 | 11/1907 | Brooks . |
| 2,167,744 | 8/1939 | Cosby et al. . |
| 2,238,096 | 4/1941 | Baker et al. . |
| 2,361,324 | 10/1944 | Severson . |
| 2,785,515 | 3/1957 | Sansig . |
| 3,036,839 | 5/1962 | Williamson . |
| 3,244,203 | 4/1966 | Leydig et al. . |
| 3,691,900 | 9/1972 | Novak et al. . |
| 3,899,852 | 8/1975 | Batson . |

FOREIGN PATENT DOCUMENTS

| | | |
|---|---|---|
| 1824252 | 12/1960 | Fed. Rep. of Germany . |
| 1126275 | 3/1962 | Fed. Rep. of Germany . |
| 1502938 | 6/1969 | Fed. Rep. of Germany . |
| 1552683 | 4/1970 | Fed. Rep. of Germany . |
| 1677134 | 6/1971 | Fed. Rep. of Germany . |
| 2926469 | 1/1981 | Fed. Rep. of Germany . |
| 2948080 | 6/1981 | Fed. Rep. of Germany . |
| 609607 | 9/1960 | Italy . |
| 49-6431 | 2/1974 | Japan . |
| 1094072 | 12/1967 | United Kingdom . |
| 2071567 | 9/1981 | United Kingdom . |

*Primary Examiner*—Roscoe V. Parker
*Attorney, Agent, or Firm*—Spencer & Frank

[57] ABSTRACT

A device for attaching a tool in portable angled grinders, allowing the connection to be released without special accessories. The device consists essentially of a hollow driveshaft, of a spindle that slides inside it, and of a tool-securing point consisting of a mating flange and nut. The nut is loosened by activating the displacing mechanism, which displaces the spindle toward the tool-securing point, lifting the nut, which is connected to the spindle by means of a threaded pin, off of the tool. The nut can then be screwed off by hand.

41 Claims, 4 Drawing Sheets

DEVICE FOR ATTACHING A TOOL

Matter enclosed in heavy brackets [ ] appears in the original patent but forms no part of this reissue specification; matter printed in italics indicates the additions made by reissue.

BACKGROUND OF THE INVENTION

The present invention relates to a device for attaching a tool in portable angled grinders, allowing the connection to be released without special accessories.

In order to replace the grinding disk in known angled grinders, the attaching flange, which is rigidly fastened to the grinding spindle, must be grasped with a special accessory. A mating flange, which is screwed onto the grinding spindle, can then be loosened with another accessory. This procedure is extremely inconvenient, entails the risk of severe injury, and is also very time-consuming.

German Pat. No. 2 926 469 accordingly proposes securing the grinding spindle with a mechanism that is integrated stationary into the drive-mechanism housing. The advantage of that solution is that only one accessory is needed, to loosen the mating flange. Still, the accessory for loosening the mating flange may often be out of reach, and the operator of an angled grinder of this type will be forced to look around for it. Since accessories often get lost, many attempts are made in practice to remove the tool by shear force, damaging the grinder. Furthermore, since the operator of a grinder of this type is not spared the necessity of carrying out a motion relative to the cutting edge of the tool with the hand that is holding the accessory, the risk of injury remains just as high as with the older type of grinder.

Another disadvantage to the tool disclosed in that German patent is the expense incurred in manufacture in order to prevent the grinder from being switched on unintentionally.

SUMMARY OF THE INVENTION

The object of the present invention is to provide a device for attaching a tool to a manually operated angled grinder or similar electric implement in such a way that no accessories are needed to establish or release the connection. The expense incurred in manufacture in order to prevent the grinder from being switched on unintentionally will also be reduced to a minimum.

This object is attained in accordance with the invention in that the angular drive mechanism, which is flanged to the motor of the angled grinder and which consists essentially of a pinion, a beveled cogwheel, and a driveshaft, has a mechanism that can be used to displace a spindle positioned inside the hollow driveshaft toward a securing point for the tool.

The axial displacement of the spindle lifts a nut, which forces the tool against the mating flange, away from the tool. The nut, which is knurled, can then easily be unscrewed from the spindle. No accessory is needed to release the nut in this design. Furthermore, it costs approximately as much to manufacture a displacing device of this type as it does to integrate a spindle-securing device stationary into the drive-mechanism housing. Since the nut is directly hand-held and not screwed on or off with an accessory while the tool is being inserted and extracted, the hand will not come into contact with the cutting edge, reducing the risk of injury.

In brief summary of the preceding description, a device for attaching a tool to an angled grinder is disclosed wherein a displacing mechanism is activated, axially displacing a spindle within a hollow driveshaft. The displacing mechanism is located at one end of the spindle, the other end of which is threaded. The threading accommodates a nut. The nut forces the tool against a mating flange that is rigidly fastened to the driveshaft. The driving motion of the shaft is accordingly transmitted to the tool.

The arrangement described above accordingly allows an essentially simpler procedure for replacing the tools than has previously been possible.

To accelerate and facilitate tool replacement even further, especially when the grinder is to be operated by a robot, the device for attaching the tool to the grinder can also be designed in such a way that the tool can be replaced without turning a nut.

In this embodiment, the threaded fastening is replaced by an insertion fastening. To allow a securing bolt to be inserted into the spindle, a bore with a cross-section that is similar to that of a facing pin on the face of the securing bolt is machined into the face of the spindle. The spindle has, like a drill chuck, slots in the vicinity of the bore to allow the cheeks of this tensioning device to move radially. The radial motion is produced by displacing the spindle axially inside the hollow driveshaft by means of the displacing mechanism and allowing an external conical surface in the slotted area of the spindle to slide over an internal conical surface at a corresponding point on the driveshaft. To attain a reliable positive connection between the pin and the bore, the surface of the pin and the wall of the bore have transverse grooves to allow them to engage when radial pressure is applied to the slotted spindle.

There is a groove with a resilient snap-in structure mounted in it on the surface of the securing bolt to ensure that the bolt has been inserted far enough toward the securing point. The resilient snap-in structure snaps into a matching groove in the hollow driveshaft as soon as it arrives at that point. The securing bolt is designed in such a way that it will rest loosely in the driveshaft when the snap-in point has not been reached, which makes it easy to tell when it must be inserted deeper.

A further embodiment is provided so that, in an angled grinder with a braking device for example, the tool would not automatically come loose subsequent to braking its rotation.

In accordance with the present invention, this embodiment is designed with a bolt screwed into the face of the spindle, which is mounted in such a way that it can be displaced axially inside the hollow driveshaft. The end of the bolt that is remote from the spindle has a flange that forces the tool against the mating flange on the drive shaft through an intermediate bushing, which also has a flange. The bushing has axial teeth along the surface of a cylindrical section. The teeth match other teeth that extend over part of the inside surface of the hollow driveshaft. Between the flange on the bushing and the flange on the bolt, the two surfaces are shaped to provide a positive connection when they engage. The positive connection is not released until the displacing mechanism, through the spindle mounted inside the shaft, lifts the bolt away from the tool and hence the flange on the bolt away from the flange on the bushing. This assumes, of course, that the stroke traveled by the displacing mechanism is longer than the toothed section between the flange on the bushing and on the bolt is deep.

Preferred embodiments of the invention will hereinafter be described with reference to the appended drawings. It is to be understood, however, that these are merely by way of example and that the scope of the protection sought for the invention is defined exclusively in the claims.

DESCRIPTION OF THE PREFERRED EMBODIMENTS

Figure 1:
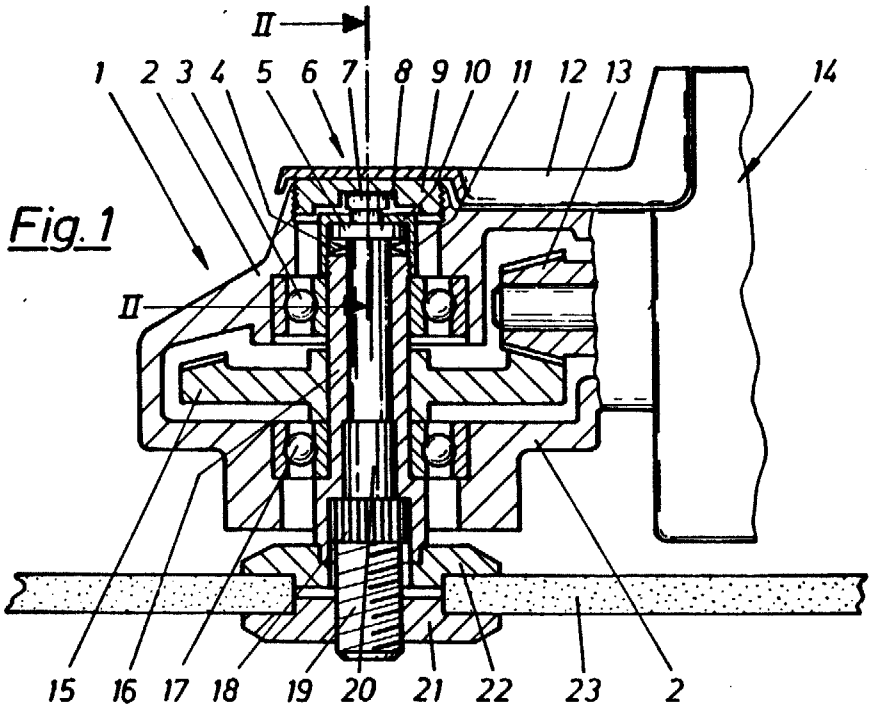
FIG. 1 is a longitudinal section through an angled grinder, with the motor represented only schematically.

The angled grinder illustrated in FIG. 1 consists essentially of a motor 14, represented truncated, of a connected drive mechanism 1, and of a tool 23. The rotation of motor 14 is transmitted through a pinion 13 to a beveled cogwheel 15 that is connected to a driveshaft 16 in such a way that it cannot rotate in relation to the shaft. Driveshaft 16 is mounted in two bearings 3 and 17 in opposite sides of a drive-mechanism housing 2. At one end of driveshaft 16 is a displacing mechanism 6 that can be operated from outside drive-mechanism housing 2. The other end of driveshaft 16 extends far enough out of drive-mechanism housing 2 for a mating flange 22, which secures tool 23, to be rigidly connected to its circumference. Driveshaft 16 is hollow to accommodate a spindle 20. Spindle 20 extends out beyond each face of driveshaft 16. At one end of driveshaft 16 spindle 20 engages with displacing mechanism 6 and at the other end with a threaded pin 19, onto which a nut 21 can be screwed. Mating flange 22 and nut 21 determine a securing point for tool 23. To synchronize driveshaft 16 with spindle 20, the spindle has teeth 18 for example distributed over a certain area and meshing with other teeth inside the driveshaft. This establishes a positive connection, ensuring that spindle 20 will rotate in synchronization with driveshaft 16 while still allowing the spindle to move axially in relation to the shaft.

The axially displacement is produced by displacing mechanism 6. The cylindrical appendage 9 of a lever 12 outside drive-mechanism housing 2 is screwed into drive-mechanism housing 2. The threaded bore in drive-mechanism housing 2 and cylindrical appendage 9 are coaxial with spindle 20. Driveshaft 16, which is mounted in such a way that it can rotate in bearings 3 and 17, has, at the end that projects beyond bearing 3, a bushing-shaped cover 11 with a circular perforation for spindle 20 in its base 10. In the remaining space between the face of driveshaft 16 and the base 10 of bushing-shaped cover 11 is a spring 4 that forces a concentric appendage 5 to spindle 20 against base 10. The terminal component 7 of spindle 20 that extends through the perforation in base 10 projects into a depression 8 in cylindrical appendage 9.

When lever 12 pivots around the axis of cylindrical appendage 9, the appendage is screwed farther into or out of drive-mechanism housing 2. When it is screwed farther in, terminal component 7, and hence spindle 20 as a whole, is displaced axially against the force of spring 4. The axial displacement lifts nut 21 from the lateral surface of tool 23. Since it is no longer necessary to overcome the compression between nut 21 and tool 23 in order to release the nut, the latter, which can be knurled for example, can readily be screwed off of threaded pin 19 manually.

To mount tool 23 it is positioned against mating flange 22 and nut 21 is screwed onto threaded pin 19. How tightly the nut rests against the tool is unimportant. It will tighten on threaded pin 19 automatically once the motor is turned on.

If the operator neglects to pivot lever 12 back into its "closed" position, the facing surfaces of terminal component 7 and of depression 8 are designed so that the friction between them will be sufficient to return the lever to that position when the motor is turned on.

It is also conceivable to employ another type of rotating element, a knob that clicks into "open" and "closed" positions for example, instead of a lever if the pitch of the threading on cylindrical appendage 9 is appropriately selected.

Figure 2:
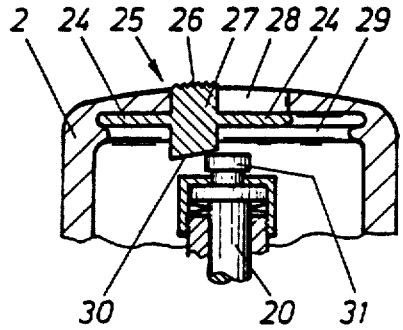
FIG. 2 is a section along the line II—II in FIG. 1 and illustrates a variant.
Figure 3:
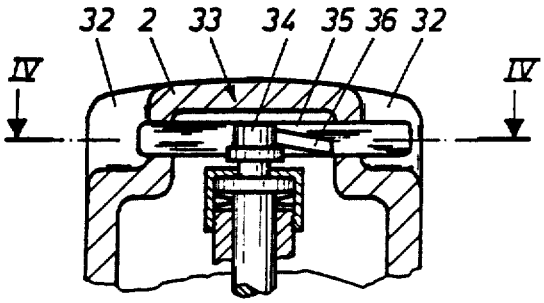
FIG. 3 is in turn a variant of the device illustrated in FIG. 2.
Figure 4:
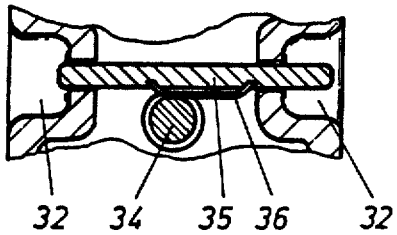
FIG. 4 is a section along the line IV—IV in FIG. 3.

FIGS. 2, 3, and 4 illustrate variants of the displacing mechanism 6 illustrated in FIG. 1 that allow the drive-mechanism housing 2 to be kept smaller.

The spindle 20 in the variant illustrated in FIG. 2 is displaced axially by a displacing mechanism 25. Displacing mechanism 25 has a displacing head 27 that can slide along rails 29 in drive-mechanism housing 2. An access surface 26 on displacing head 27 extends through an aperture 28 and beyond the outer contour of drive-mechanism housing 2. To prevent dust from getting into drive-mechanism housing 2 for instance when displacing head 27 is displaced, the head has two protective strips 24, each of which extends over aperture 28. Displacing head 27 has a sloping surface 30 on the side facing spindle 20. When displacing head 27 is displaced from the "closed" limiting position to the "open" limiting position, sloping surface 30 slides over terminal component 31, forcing spindle 20 toward the tool-securing point.

The displacing mechanism 33 in the variants illustrated in FIGS. 3 and 4 is designed in such a way that it cannot be unintentionally displaced for example when the angled grinder is laid down. There are accordingly troughs 32 in drive-mechanism housing 2 at the transitions between the two lateral surfaces and the side of the housing facing away from tool 23. Troughs 32 have perforations that accommodate a sliding rod 35 that can be moved across the axis of driveshaft 16. Sliding rod 35 travels laterally past a terminal component 34. When sliding rod 35 is displaced, a resilient structure 36 mounted at an angle on it forces a bead on terminal component 34 toward the tool-securing point. Thus, sloping resilient structure 36 produces the same effect as the sloping surface 30 in the variant illustrated in FIG. 2. As will be evident from FIG. 4, terminal component 34 can rotate even when the operator has forgotten to displace sliding rod 35 into the "closed" position before turning on the motor.

The designs described with reference to FIGS. 2, 3, and 4 especially facilitate replacing the tool in the angled grinder. The compact design hardly increases the size of the housing at all. Reliability is increased because the motor can be turned on without any component being blocked inside the housing.

Figure 5:
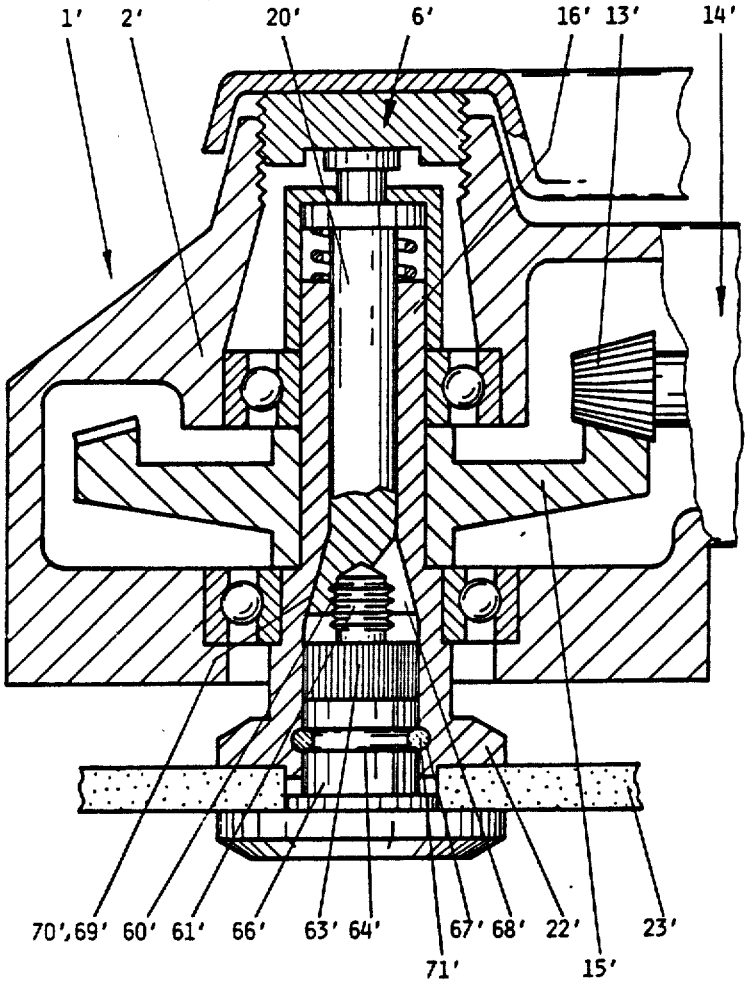
FIG. 5 is a longitudinal section through another embodiment of angled grinder, with the motor represented only schematically.

The angled grinder illustrated in FIG. 5 consists essentially of a motor 14', a drive mechanism 1', and a tool [23] *23'*. The rotation of motor 14' is transmitted to a beveled cogwheel 15' through a pinion 13'. Beveled cogwheel 13' is mounted on a driveshaft 16' in such a way that it can neither rotate in relation to the shaft nor slide along it. Driveshaft 16' is mounted in two bearings secured in a drive-mechanism housing 2'.

A displacing mechanism 6' can axially displace a spindle 20' positioned inside the hollow driveshaft 16' as described with reference to FIG. 1.

There is a mating flange 22' that extends out of drive-mechanism housing 2' on the end of driveshaft 16' that is remote from displacing mechanism [4'] *6'*. Tool 23' rests against mating flange 22', whereupon a securing bolt 66' can be inserted through an accommodation aperture in tool 23' into hollow driveshaft 16'. The face of securing bolt 66' has a pin [67'] *61'* that slips into a matching bore 60' in spindle 20' when securing bolt 66' is inserted in driveshaft 16'. Spindle 20' has slots 68' in the vicinity of bore 60'. Slots 68' make it possible to force the end of spindle 20' outward radially. This force is generated when securing bolt 66' is inserted in driveshaft 16' and pin [67'] *61'* slips into bore 60'. Displacing mechanism 6' is then displaced into the "closed" position, moving spindle 20' away from [tool'] *tool 23'*. Pin [67'] *61'* is then securely clamped into bore 60' in spindle 20' by an external conical surface 69' in the vicinity of slots 68' in spindle 20' and by a matching internal conical surface 70' in driveshaft 16'. To ensure a positive connection, the surface of pin [67'] *61'* and the wall of bore 60' have transverse grooves. Once pin [11'] *61'* has been secured, securing bolt 66' as a whole is tensioned toward displacing mechanism 6', securing tool 23'. To prevent relative rotation between driveshaft 16' and securing bolt 66', both parts have matching teeth 63'.

A resilient snap-in structure [77'] *71'* is inserted in a groove 64' that surrounds securing bolt 66'. Only when resilient snap-in structure [77'] *71'* engages a groove 67' in hollow driveshaft 16' has the point been attained at which a positive connection between pin [67'] *61'* and spindle 20' can be produced. The tolerances between securing bolt 66' and driveshaft 16' have been selected such that the bolt will otherwise lie loosely in the shaft.

Figure 6:
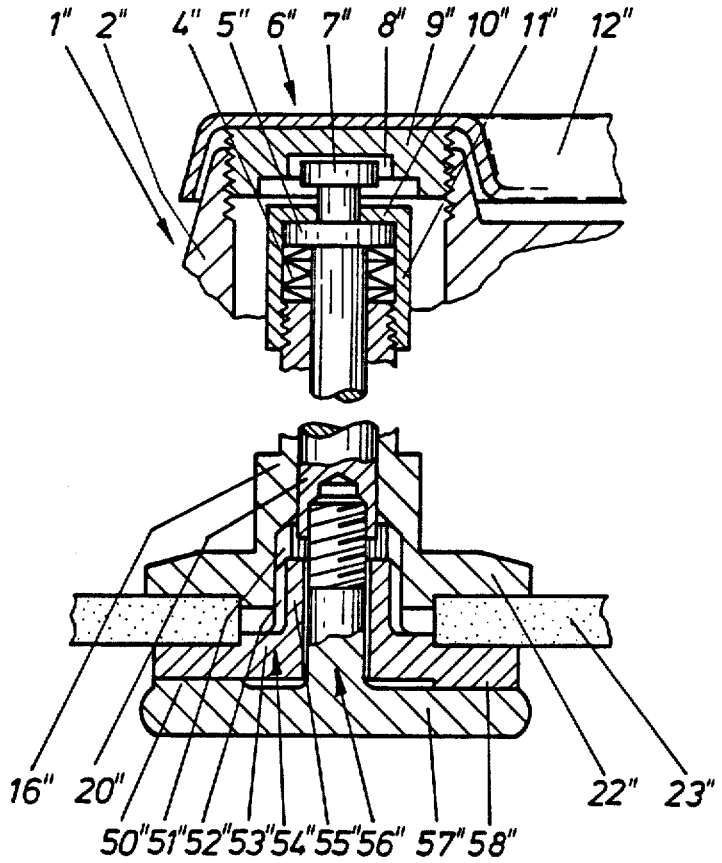
FIG. 6 is a section through the drive-mechanism housing of an angled grinder with known drive-mechanism elements left out.

The gear head 1" illustrated in FIG. 6 has a displacing mechanism 6" that extends on one side out of a drive-mechanism housing 2". Displacing mechanism 6" consists essentially of an activating mechanism 12" and a stroke mechanism 9". Rotating activating mechanism 12" screws stroke mechanism 9", which is rigidly connected to it, axially into or out of a thread in drive-mechanism housing 2" in relation to a driveshaft 16" mounted in the housing. A spindle 20" is mounted in such a way as to be displaced axially inside the hollow driveshaft 16" as described in the foregoing against the force of resilient structures 4" by means of displacing mechanism 6". Driveshaft 16" has at one end a bushing-shaped cover 11" with a circular perforation that accommodates spindle 20" in its base 10". In the remaining space between the face of driveshaft 16" and the base 10" of bushing-shaped cover 11", resilient structures 4" force a concentric appendage 5" to spindle 20" against base 10". The terminal component 7" of spindle 20" that extends through the perforation in base 10" projects into a depression 8" in cylindrical appendage 9". A mating flange 22" is mounted on the end of driveshaft 16" that is remote from displacing mechanism 6". A tool 23" rests against mating flange 22". An appendage on mating flange 22" centers tool 23". A flange 57" on a bolt 56" indirectly forces tool 23" against mating flange 22" through a flange 53" on a bushing 54". The force is generated when bolt 56" in inserted through the cylindrical section 55" of bushing 54" and its front, which is threaded, screwed into matching threading inside spindle 20", subsequent to which the activating mechanism 12" of displacing mechanism 6" is shifted into the "closed" position. The resulting pressure is sufficient to seat tool 23".

Hollow driveshaft 6" has a wider bore in the vicinity of mating flange 22". The wall of the wider bore has longitudinal grooves 51". Matching teeth 52" in the surface of the cylindrical section 55" of bushing 54" can be inserted in longitudinal grooves 51", ensuring positive transmission of the rotation of driveshaft 16" to bushing 54".

To prevent bolt 56" from twisting out of the thread in spindle 20" when driveshaft 16" is compulsorily braked, flanges 53" and 57" have radial teeth 58" and 50" on their facing surfaces. Teeth 58" and 50" ensure that bolt 56" will rotate along with driveshaft 16" as long as activating mechanism 12" remains in the "closed" position. The collar-like distribution of teeth 58" and 50" on the facing surfaces of flanges 53" and 57" ensures that the contact force can also be absorbed through flange 57".

To ensure that the operator can conveniently screw bolt 56" onto spindle 20" it is recommendable for the edge of flange 57" to be designed such that it can easily be grasped with the hand. This can be done for example by knurling it and/or covering it with a soft and resilient material.

To remove tool 23", activating mechanism 12" must be shifted into the "open" position, whereupon displacing mechanism 6" will displace spindle 20" against the force of resilient structures 4". The stroke will be sufficient to disengage the teeth 50" on the flange 57" on bolt 56" from the teeth 58" on the flange 53" on bushing 54". Bolt 56" can then be screwed out of spindle 20", bushing 54" extracted from driveshaft 16", and tool 23" replaced.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

We claim:

1. Apparatus for attaching a tool in portable angled grinders comprising a motor; angular drive means, and a securing station for the tool; said angular drive means comprising a pinion, a beveled cogwheel, and a hollow driveshaft having an axis; a spindle positioned in said driveshaft; housing means for housing said drive means; displacing means, said spindle being positioned in said driveshaft so that it cannot rotate *relative to the drive-shaft* but can be displaced axially from outside said housing means by said displacing means; activating means in said displacing means; traveling means and a terminal component, said spindle having an appendage;

resilient means between a face of said driveshaft and said appendage on said spindle, said activating means in said displacing means acting [through said traveling means at an angle to the axis of said driveshaft] on said terminal component against a force of said [resilinet] *resilient* means *by use of surface of said traveling means, said surface being inclined at an angle to the axis of said driveshaft*; said [driveshaft] *spindle* having a threaded pin; a nut screwed onto said threaded pin; a bushing-shaped cover on said driveshaft for limiting travel so that said nut screwed onto said threaded pin on said [driveshaft] *spindle* is lifted away from the tool.

[2. Apparatus according to claim 1, wherein said spindle has teeth engaging inside the hollow driveshaft.]

[3. Apparatus according to claim 1, including a cylindrical appendage on said displacing means; said terminal component being on said spindle; said housing means having a threaded bore; said cylindrical appendage on said displacing means acting on said terminal component to an extent that it is screwed into or out of said threaded bore in said housing means.]

[4. Apparatus according to claim 1, including a guide in said housing means, said displacing means comprising a displacing head slidable in said guide in said housing means; said displacing head having a sloping surface on a side extending into said housing means.]

[5. Apparatus according to claim 1, including a sliding rod and troughs with a perforation for accommodating said sliding rod in edges between lateral surfaces and a surface of said housing facing toward the tool; said sliding rod having a spring extending across a direction in which the rod slides in center of a side facing said terminal component.]

6. Apparatus [according to claim 1, wherein] *for attaching a tool in portable angled grinders comprising a motor; angular drive means, and a securing station for the tool; said angular drive means comprising a pinion, a beveled cogwheel, and a hollow driveshaft having an axis; a spindle positioned in said driveshaft; housing means for housing said drive means; displacing means, said spindle being positioned in said driveshaft so that it cannot rotate relative to the driveshaft but can be displaced axially by said displacing means; activating means in said displacing means; traveling means and a terminal component, said spindle having an appendage; resilient means between a face of said driveshaft and said appendage on said spindle, said activating means in said displacing means acting on said terminal component against a force of said resilient means by use of a surface of said traveling means, said surface being inclined at an angle to the axis of said driveshaft;* said displacing means [can be activated] *being activatable* from outside said housing means[, said tool being attachable in portable angled grinders with said displacing means that can be activated from outside said housing means]; said spindle [being positioned in said hollow driveshaft and] having [tensioning means] *clamping means* on an end remote from said displacing means *for clamping said tool; said tool being attachable with said displacing means that can be activated from outside said housing means cooperating with said clamping means.*

[7. Apparatus according to claim 6, wherein said spindle has slots forming a drill chuck and an external conical surface in vicinity of said slots.]

[8. Apparatus according to claim 7, wherein said driveshaft has an internal conical surface in vicinity of said external conical surface.]

[9. Apparatus according to claim 7, wherein said spindle has a bore of an end of said engine, said end having said slots.]

[10. Apparatus according to claim 9, wherein said bore has positive-locking means comprising transverse grooves in a wall of said bore.]

[11. Apparatus according to claim 6, including a securing bolt connected releasably by said tensioning means to said spindle.]

[12. Apparatus according to claim 11, wherein said spindle has an end face with a bore having a wall with grooves, said securing bolt having a pin at an end toward said tensioning means, said pin having a surface with positive-locking means comprising transverse grooves engaging the grooves in said wall of said bore.]

[13. Apparatus according to claim 11, including resilient snap-in means, said securing bolt having around it a groove accommodating said resilient snap-in means.]

14. Apparatus [according to claim 1, wherein the tool is attachable in portable angled grinders; stroke means; means for mounting said spindle to be displaceable axial but not rotatable in said hollow driveshaft, said spindle being displaceable by said displacing means from outside said housing means, said activating means acting in said housing means through said stroke means transversely to said axis of said driveshaft on said terminal component against a force of said resilient means;] *for attaching a tool in portable angled grinders comprising a motor; angular drive means, and a securing station for the tool; said angular drive means comprising a pinion, a beveled cogwheel, and a hollow driveshaft having an axis; a spindle positioned in said driveshaft; housing means for housing said drive means; displacing means, said spindle being positioned in said driveshaft so that it cannot rotate relative to the driveshaft but can be displaced axially from outside said housing means by said displacing means; activating means in said displacing means; traveling means and a terminal component, said spindle having an appendage; resilient means between a face of said driveshaft and said appendage on said spindle, said activating means in said displacing means acting on said terminal component against a force of said resilient means by use of a surface of said traveling means, said surface being inclined at an angle to the axis of said driveshaft;* a bushing-shaped cover for limiting a stroke and attached to said driveshaft; a bushing with a flange [lifted away from] *for engaging* the tool[,] *; and* a bolt with a flange screwed into [another face] *an end* of said spindle[and] *, said bushing being* positively [connected by said flange on said bolt through said flange on said bushing lifted away from the tool and thereby from the flange on said bushing] *connectable with said end of said spindle.*

[15. Apparatus according to claim 1, wherein said bushing has surface with cylindrical section, said cylindrical section having positive-locking means comprising teeth, parallel to an axis of said bushing.]

[16. Apparatus according to claim 15, including teeth between both said flanges, said teeth having a depth which is less than a stroke of said displacing means.]

[17. Apparatus according to claim 14, wherein said bolt has means for producing manipulation at an edge of said flange on said bolt.]

[18. Apparatus according to claim 16, wherein said teeth between said flanges extend over part of a radial expansion.]

[19. Apparatus according to claim 14, wherein an end of said bolt remote from the flange on said bolt is threaded.]

[20. Apparatus according to claim 14, wherein said spindle has a face with a threaded bore.]

[21. Apparatus according to claim 19, wherein said spindle has internal threads; theads on said bolt and the threads in said spindle being long enough for adapting to tools varying in thickness.]

[22. Apparatus according to claim 14, including appendages on a mating flange, said tool being centered on said appendages on said mating flange and on said flange on said bushing.]

*23. A tool driving unit for a portable power-tool, comprising:*

*a housing;*

*a hollow outer spindle having an axis;*

*an inner spindle within the outer spindle, one of the spindles being slidable with respect to the other spindle in the axial direction of the outer spindle;*

*tool holding means, connected to the outer spindle and to the inner spindle, for releasably holding a tool, the tool holding means including a first flange element connected to the outer spindle and a second flange element connectable to the inner spindle at a position adjacent the first flange element, the second flange element being detachable from the inner spindle;*

*spring means for biassing the inner spindle and outer spindle with respect to each other to urge the flange elements toward each other;*

*an actuating element which is movable from outside the housing, by a manually applied force, between a release position and an operating position; and*

*release means, multiplying the force applied to the actuating element, for acting on one of the spindles to displace said one of the spindles axially against the force of the spring means when the actuating element is moved from its operating position toward its release position, the axial displacement moving the flange elements apart so that the second flange element can be manually detached from the inner spindle without tools, said release means not acting on said one of the spindles when the actuating element is in its operating position.*

*24. The tool driving unit of claim 23, wherein the release means comprises a pressure element connected to the actuating element, the pressure element having a surface with at least one portion which is inclined and extends transverse to the axis of the outer spindle and which causes the pressure element to bear against the slidable spindle when the actuating element is moved from its operating position to its release position.*

*25. The tool driving unit of claim 24, wherein the housing has a threaded opening, wherein the pressure element has a periphery, and wherein the at least one inclined portion of the surface of the pressure element comprises a thread on the periphery of the pressure element so that the pressure element screws into the threaded opening in the housing.*

*26. The tool driving unit of claim 24, wherein the at least one inclined portion of the surface of the pressure element faces the slidable spindle and slidably engages the slidable spindle as the actuating element is moved from its operating position to its release position.*

*27. The tool driving unit of claim 24, wherein the actuating element is elongated and has an axis, wherein the housing comprises means mounting the actuating element for axial movement, with the axis of the actuating element being transverse to the axis of the outer spindle, and wherein the at least one inclined portion of the surface of the pressure element is transverse to the axis of the actuating element in addition to being transverse to the axis of the outer spindle.*

*28. The tool driving unit of claim 23, wherein the inner spindle has a threaded end, and wherein the second flange element has a threaded opening to permit the second flange element to be detachably screwed onto the threaded end of the inner spindle.*

*29. The tool driving unit of claim 23, further comprising keying means for locking the spindles together with respect to rotation, so that rotation of one spindle causes the other to rotate.*

*30. The tool driving unit of claim 23, wherein the outer spindle has an end, and further comprising an appendage on the inner spindle, the appendage being spaced apart from the end of the outer spindle, and wherein the spring means is disposed between the end of the outer spindle and the appendage on the inner spindle.*

*31. The tool driving unit of claim 23, further comprising means attached to one of the spindles and cooperating with the other of the spindles for limiting sliding movement between the spindles.*

*32. The driving unit of claim 23, wherein the tool holding means additionally comprises clamping means, actuatable by a sliding movement of the spindles when the actuating element is moved from the release position toward the operating position, for gripping the second flange element after it has been manually placed in a receiving position adjacent the clamping means.*

*33. The driving unit of claim 23, wherein the tool holding means further comprises bushing means, disposed between the flange elements and contacting the second flange element, for isolating the second flange element from torque.*

*34. A portable power-tool for spinning an exchangeable working tool, comprising:*

*a housing having an opening;*

*a hollow outer spindle in the housing, the outer spindle having an axis which extends through the opening;*

*an inner spindle disposed in the outer spindle, one of the spindles being displaceable in the axial direction with respect to the other spindle;*

*a first flange element;*

*means for mounting the first flange element to the outer spindle so that the first flange element is disposed outside the housing and adjacent the opening;*

*a second flange element;*

*means for detachably mounting the second flange element to the inner spindle so that the second flange element is disposed outside the housing adjacent the first flange element;*

*spring means for biassing the displaceable spindle to clamp a working tool that has been placed between the flange elements;*

*an actuating member having a manually engageable portion and having a contact area; and*

*means for mounting the actuating member so that the contact area is adjacent the displaceable spindle and the manually engageable portion extends outside the housing, the manually engageable portion being manually movable along a path between an operating position and a release position, the contact area, in the course of said movement of said manually engageable portion from the operating position toward the release position, being moved over a distance shorter than said path and pressing against the displaceable spindle to*

*slide the displaceable spindle against the force of the spring means so that the second flange element can be manually detached during an exchange of working tools.*

*35. The portable power-tool of claim 34, wherein the actuating member comprises a lever, and wherein the means for mounting comprises means for rotatably mounting the lever on the housing.*

*36. The portable power-tool of claim 34, wherein the actuating member is movable in a direction transverse to the axis of said hollow spindle, and wherein the means for mounting comprises means for guiding the actuating member on the housing so that the actuating member is slidable along that direction.*

*37. The portable power-tool of claim 34, further comprising a cover element attached to the outer spindle, the cover element having an opening through which the inner spindle extends, and wherein the spring means is disposed inside the cover element.*

*38. The portable power-tool of claim 34, wherein the means for detachably mounting the second flange element additionally comprises clamping means, actuatable by movement of the displaceable spindle when the manually engageable portion of the actuating member is moved from its release position toward its operating position, for gripping the second flange element after it has been manually placed in a receiving position adjacent the clamping means.*

*39. The portable power-tool of claim 38, wherein the means for detachably mounting the second flange element additionally comprises means, extending parallel to the axis of the outer spindle, for keying the second flange element to the outer spindle so that the second flange element is slidable but not rotatable with respect to the outer spindle.*

*40. The portable power-tool of claim 34, wherein the working tool has an opening through which the means for detachably mounting extends, and further comprising a bushing member between the second flange element and the working tool, and means extending through the opening in the working tool for keeping the bushing member from rotating with respect to the outer spindle.*

*41. A tool driving unit for a power-tool comprising:*

*a hollow outer spindle having an axis;*

*an inner spindle within the outer spindle, one of the spindles being slidable in the axial direction with respect to the other spindle;*

*means for selectively shifting one of the spindles with respect to the other spindle between a release position and a clamp position; and*

*tool holding means, connected to the spindles, for releasably holding a tool, the tool holding means including*

*a first flange element connected to one of the spindles,*

*a second flange element, and*

*clamping means, connected to the other spindle and actuatable by a shifting movement of the spindles from the release position toward the clamp position, for gripping the second flange element after it has been manually placed in a receiving position adjacent the clamping means and for moving the second flange element toward the first flange element to clamp the tool between the flange elements.*

*42. The tool driving unit of claim 41, wherein the clamping means comprises gripping appendages attached to said other spindle.*

*43. The tool driving unit of claim 42, wherein the gripping appendages are actuatable by a flared portion either at the gripping appendages or at said one of the spindles.*

*44. The tool driving unit of claim 43, wherein the first flange element is connected to the outer spindle, wherein the outer spindle has a flared portion; and wherein the gripping appendages comprise an end portion of the inner spindle, the end portion being flared and fitting within the flared portion of the outer spindle, the end portion of the inner spindle having a bore and having at least one slot which extends outward from the bore for forming the gripping appendages.*

*45. The tool driving unit of claim 44, wherein the second flange element comprises a flange portion, a pin portion which fits into the bore, and a connecting portion between the flange portion and the pin portion, and wherein the clamping means further comprises at least one abutment on the pin portion, and at least one abutment which is attached to the gripping appendages to grip onto the at least one abutment on the pin portion when the spindles are selectively shifted from their release position to their clamp position.*

*46. The tool driving unit of claim 45, wherein the at least one abutment attached to the gripping appendages comprises a plurality of annular ridges which project into the bore, and wherein the at least one abutment on the pin portion comprises plurality of annular ridges.*

*47. The tool driving unit of claim 45, wherein the connecting portion has an annular groove between the pin portion and the flange portion, and further comprising a stop ring in the annular groove.*

*48. The tool driving unit of claim 45, further comprising means for keying the connecting portion to the outer spindle so that the connecting portion cannot rotate with respect to the outer spindle.*

*49. The tool driving unit of claim 41, wherein the means for selectively shifting comprises:*

*spring means for biassing the spindles toward the clamp position;*

*an actuating member having a manually engageable portion and having a contact area; and*

*means for mounting the actuating member so that the actuating member is movable between first and second positions by a force manually applied to the manually engageable portion, the contact area of the actuating member pressing on the slidable spindle to shift the spindles from the clamp position toward the release position when the actuating member is moved from its first position toward its second position, the force exerted by the contact area on the slidable spindle when the actuating member is moved from its first position toward its second position being greater than the force applied to the manually engageable portion to move the actuating member from its first position to its second position.*

*50. A tool driving unit for a power-tool, comprising:*

*a drive member having an axis; and*

*tool holding means, connected to the drive member, for releasably holding a tool, the tool holding means including*

*a first clamping flange affixed to the drive member;*

*a bushing flange,*

*a second clamping flange,*

*means for detachably connecting the second clamping flange to the drive member, with the second clamping flange pressing the bushing flange toward the first clamping flange, and with the tool being disposed between the bushing flange and the first clamping flange, and*

*keying means for non-rotatably holding the bushing member with respect to the first clamping flange*

*while permitting the bushing flange to move axially with respect to the drive member.*

*51. The tool driving unit of claim 50, wherein the drive member comprises a hollow outer spindle, and an inner spindle which is slidably disposed in the outer spindle, wherein the first clamping flange is affixed to the outer spindle, and wherein the means for detachably connecting the second clamping flange to the drive member comprises means for detachably connecting the second clamping flange to the inner spindle.*

*52. The tool driving unit of claim 51, further comprising;*

*spring means for biassing the inner spindle away from the first clamping flange so as to urge the second clamping flange toward the tool;*

*an actuating member having a manually engageably portion and having a contact area; and*

*means for mounting the actuating member so that the contact area is adjacent the inner spindle and so that the manually engageable portion is manually movable along a path between an operating position and a release position, the contact area, in the course of said movement of said manually engageable portion from the operating position toward the release position, being moved over a distance shorter than said path and pressing against the inner spindle to slide the inner spindle toward the first clamping flange against the force of the spring means so that the second flange element can be manually detached.*

*53. The tool driving unit of claim 52, wherein the tool has an opening, and wherein the means for detachably connecting the second clamping flange to the inner spindle comprises a threaded bolt which extends through the opening in the tool.*

*54. The tool driving unit of claim 53, wherein the keying means comprises a keying element which contacts the bushing flange and which extends through the opening in the tool.*

*55. The tool driving unit of claim 54, wherein the keying element comprises a hollow sleeve affixed to the bushing flange, the threaded bolt extending through the hollow sleeve.*

*56. The tool driving unit of claim 55, wherein the bushing flange has a surface which contacts a surface of the second clamping flange, and further comprising further keying elements on the surface of the bushing flange which contacts the second clamping flange, and additional keying elements on the surface of the second clamping flange which contacts the bushing flange.*

*57. The tool driving unit of claim 56, wherein the further keying elements on the bushing flange and the additional keying elements on the second clamping flange have a keying depth that is selected so that the further keying elements on the bushing flange are spaced apart from the additional keying elements on the second clamping flange when the actuating member is in its release position.*

*58. The tool driving unit of claim 50, wherein the tool has an opening through which the means for detachably connecting extends, and wherein the keying means comprises a keying element which contacts the bushing flange and which extends through the opening in the tool.*

*59. The tool driving unit of claim 58, wherein the means for detachably connecting comprises a threaded bolt, and wherein the keying element comprises a hollow sleeve attached to the bushing flange, the threaded bolt extending through the hollow sleeve.*

*60. The tool driving unit of claim 59, wherein the keying means further comprises at least one abutment on the hollow sleeve, and at least one further abutment on one of the inner spindle, outer spindle, and first clamping flange to slidably engage the at least one abutment on the hollow sleeve.*

* * * * *